April 16, 1935. W. G. HETHERINGTON ET AL 1,997,639
UNIVERSAL BRAKE AND DRUM GAUGE
Filed May 26, 1931 2 Sheets-Sheet 1
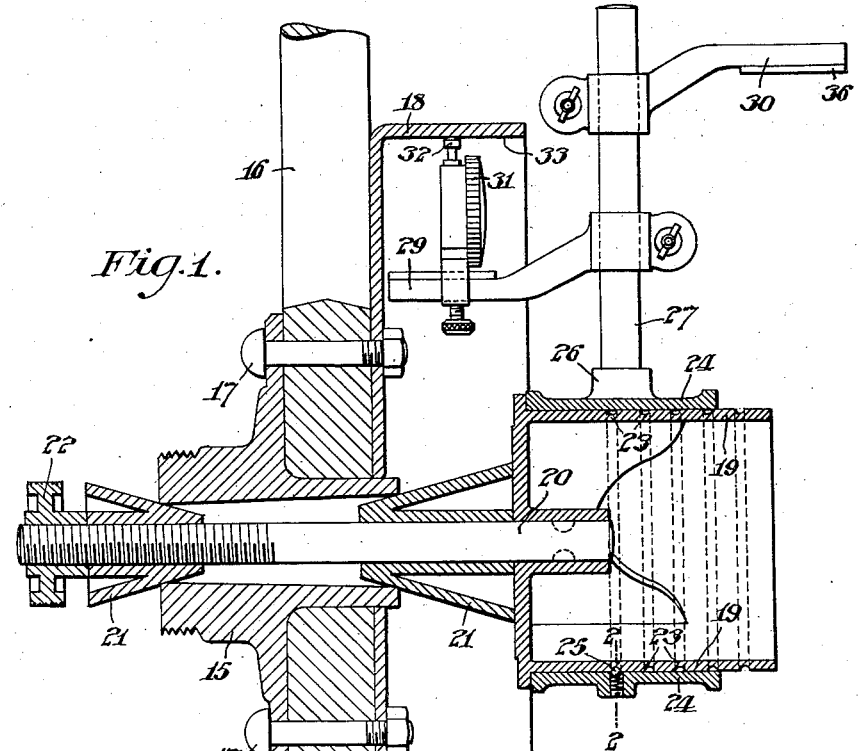
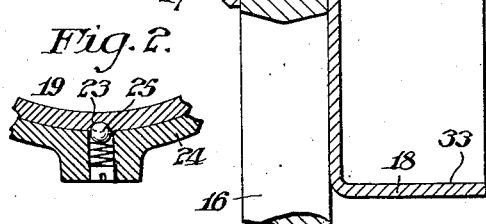
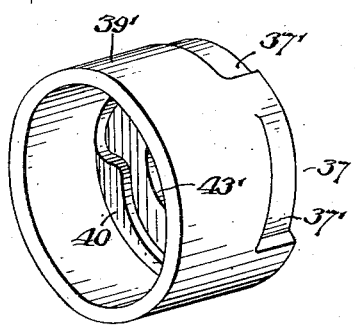
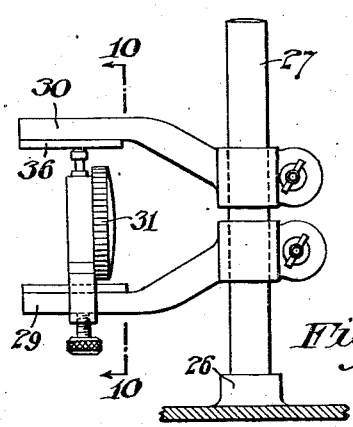
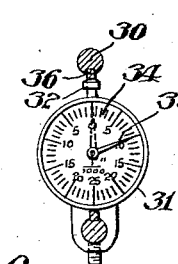
Inventors:
William George Hetherington,
and George W. Ufford,
By  Thos. Croasdale
Attorney.

April 16, 1935.  W. G. HETHERINGTON ET AL  1,997,639
UNIVERSAL BRAKE AND DRUM GAUGE
Filed May 26, 1931  2 Sheets-Sheet 2

Inventors:
William George Hetherington
and George W. Ufford,
By
Attorney.

Patented Apr. 16, 1935

1,997,639

UNITED STATES PATENT OFFICE 1,997,639

UNIVERSAL BRAKE AND DRUM GAUGE

William George Hetherington and George W. Ufford, Philadelphia, Pa.; said Ufford assignor to said Hetherington Application May 26, 1931, Serial No. 540,028

11 Claims. (Cl. 33—180)

Our invention relates to improvements in universal brake and drum gauge. The object is to provide an improved drum gauge or means for indicating the peripheral contour of the inner contacting surface of a brake drum, and an improved brake gauge or means associated with, and adjusted with respect to the drum gauge, for determining the clearance between the brake lining and said cooperating drum surface, and for assuring a perfect peripheral contour of the contacting face of said brake lining.

The invention comprises improved means for mounting, associating and operating said gauges in order to secure true contours and the proper relationship between the drum and the brake lining.

Referring to the drawings which illustrate, merely by way of example, a suitable embodiment of the invention;

Fig. 1 is an elevation showing the drum gauge in operative position, with associated elements, partly in section.

Fig. 2 is a section on line 2, 2 of Fig. 1, but on enlarged scale.

Fig. 4 is a perspective view of a housing section of the chuck.

Fig. 9 is an elevation showing the arrangement for setting the brake gauge with respect to the required clearance, and Fig. 10 is a section on line 10, 10 of Fig. 8.

Similar numerals refer to similar parts throughout the several views.

Figure 3:
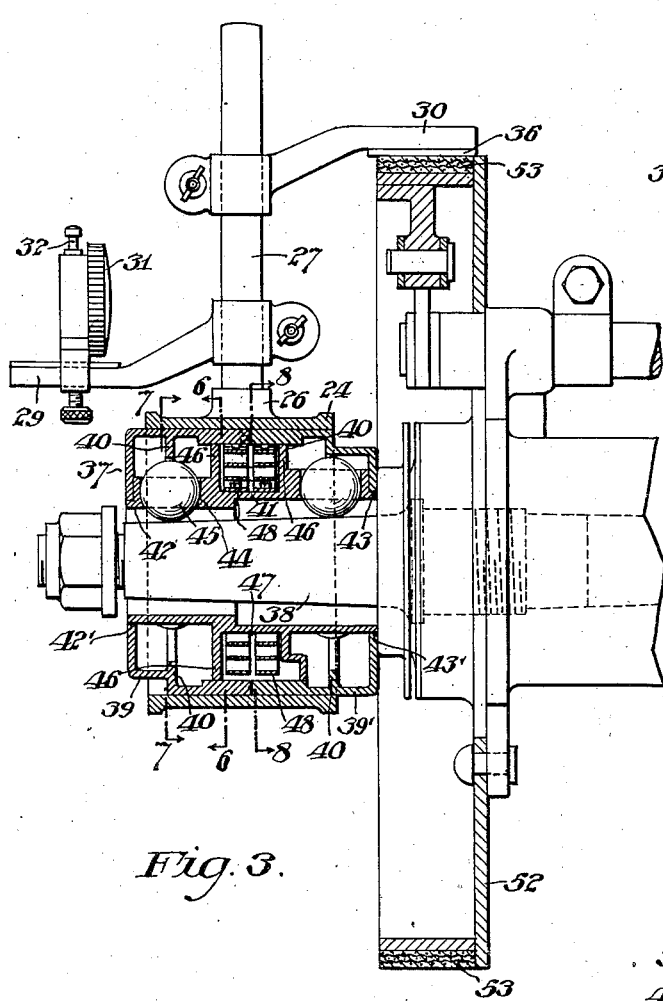
Fig. 3 is an elevation showing the brake gauge in operative position with associated parts partly in section.
Figure 6:
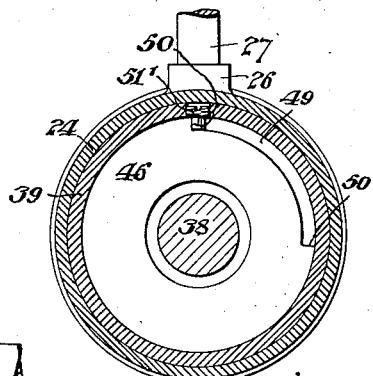
Fig. 6 is a section on line 6, 6 of Fig. 3.

In Fig. 1 is shown the hub 15 and parts of the spokes 16 of an automobile wheel to which is secured, by means of bolts 17, the brake drum 18. For purposes of the present invention an adapter 19 of cylindrical form is shown. This adapter is mounted on a threaded spindle 20 which is secured or mounted in the hub 15 by means of the cones 21, 21 and the hand operated nut 22. The cones are of course true, with case hardened surfaces, and have a very close sliding fit on the spindle 20, so that when the cones are brought into tight contact with the bore of the hub at each end, the axis of the spindle coincides with that of the wheel and consequently with the axis of the adapter 19. It follows, that if the contacting peripheral surface of the drum 18 is true, its axis will coincide with the projected axis of the wheel. Various sized cones may be used to accommodate different sized wheels, and hence the device, with a suitable set of interchangeable cones, may be used with wheels of varying sizes.

The adapter 19 is provided with a number of parallel peripheral grooves or channels 23.

A hub 24 is adapted to have a closed sliding fit over the adapter 19; it is provided with a spring pressed ball 25, see Fig. 2, or other suitable device adapted to project through the inner peripheral surface of the hub and engage with a channel 23, thus permitting relative rotative movement between adapter and hub, but normally preventing relative lateral movement until sufficient arbitrary force is applied to hub and adapter to cause the movement of the ball 25 from one channel 23 to another. The hub 24 is provided with a boss 26 in which is secured a rod 27 extending radially from the hub.

Upon the rod 27 are slidably mounted the gauge elements 29 and 30, each having a thumb clamp screw for clamping same in position of adjustment upon the rod. Upon gauge element 29 is mounted a suitable visible indicator gauge 31. This gauge 31 has a projecting pin 32 adapted to engage the contacting periphery 33 of the brake drum. The dial 34 of the gauge may be set at any desired point with respect to pointer 35, after contact is made between pin 32 and the surface 33 of the drum. The hub 24 carrying the gauge 29—31 is then rotated on the adapter, and any deviation from a true contour of surface 33 is visually indicated by the pointer.

By shifting the hub laterally on the adapter, substantially the entire surface 33 of the drum can be covered. If any serious deviations from a true contour are indicated by the gauge, the drum should be treated accordingly.

In case the drum is found sufficiently true, the hub 24 is removed from the adapter 19, and placed upon a chuck 37 mounted on the axle 38 of the wheel, as in Fig. 3.

This chuck 37 is so constructed as to fit axles of varying shapes and sizes and to adjust itself to the axle so that the cylindrical periphery of the chuck 37 will have an axis which will coincide with that of the axle.

The axle has a definite relation with the brake shoe 52 carried on the chassis, that is, the periphery of the brake lining 53 must have an axis corresponding with that of the axle. Therefore, when the hub 24 is mounted on the chuck 37, the gauge elements 29 and 30 will describe true circles about the axis of the axle.

It will be noted that the gauge 29—31 will have been adjusted for gauging the surface 33 of the drum. While in this relative position with respect to the drum, the hub 24 is removed from the adapter, and the gauge 30 is turned about rod 27 and brought above the pin 32 of gauge 29—31. The contact strip 36 of gauge 30 is brought into contact with the top of pin 32 and pressed against the same until the pointer 35 indicates the desired clearance, for example 10/1000 of an inch, as shown in Figs. 9 and 10. The gauge 30 is then clamped firmly in said position of adjustment; the gauge 29 is moved out of the way and the hub 24 is placed upon the chuck 37, with the gauge 30 extending to the right of rod 27 as shown in Fig. 3. In this position gauge 30 is adapted to operate not only to insure the proper clearance of the brake band or lining but also to assure that the peripheral surface of the same is a true circle about an axis corresponding with the axis of the drum.

It will thus be seen that, by the combination described and illustrated, gauging means are provided applicable to varying sizes of axle and drum, for proving the contour of the drum and of the brake lining, for measuring the required clearance from said drum to the brake lining, and for utilizing the visual indications of the drum gauge for securing the proper adjustment of the brake lining gauge.

In Figs. 3 to 7 inclusive, we have shown a universal chuck 37 for rotatably supporting the brake gauge 30 with respect to the axle 38. This chuck is adapted automatically to fit axles of various shapes and sizes and invariably to assume a position with its axis coinciding with that of the axle.

This chuck comprises a cylindrical housing in two sections, 39 and 39', each having a true circular periphery. The interior wall of each housing section is provided with three evenly spaced and similar cam formations 40. Each housing section is provided with a partially closed end, having a central circular opening to receive the axle; one opening being preferably larger than the other to correspond with the usual taper of the axle.

The outer ends of the two sections, may be provided with suitable formations or contours, such as 37', either for hand or tool manipulation, as desired.

Figure 7:
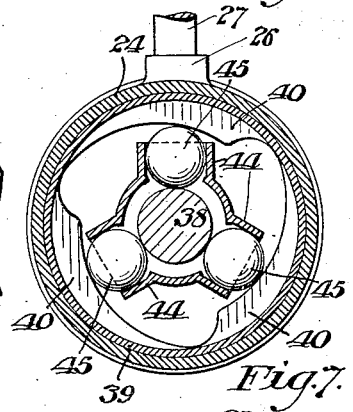
Fig. 7 is a section on line 7, 7 of Fig. 3.
Figure 8:
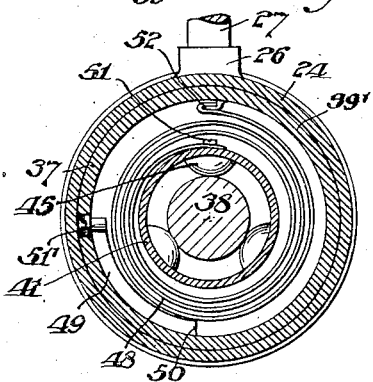
Fig. 8 is a section on line 8, 8 of Fig. 3.
Figure 5:
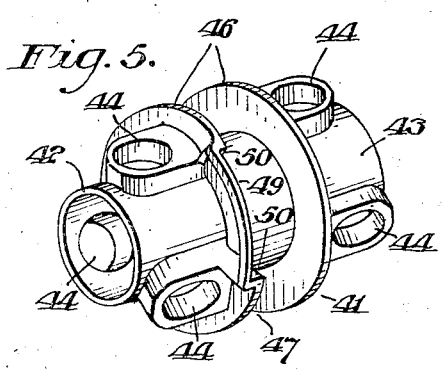
Fig. 5 is a perspective view of the keeper forming an element of the chuck.

A keeper 41 is provided, as shown in Fig. 5. This keeper has an interior cylindrical formation with cylindrical ends 42 and 43 adapted to fit in the openings 42' and 43' in the ends of the sections 39 and 39'. Near each end of the keeper, are provided a plurality of equidistant radially extending flanged openings or pockets 44, for receiving the balls 45, which balls are preferably made hollow. These pockets 44, as clearly shown in Fig. 7, are provided with inwardly extending ridges or flanges for limiting the movement of the balls toward the center of the chuck, that is for preventing the balls leaving the pockets. These openings are so positioned with respect to the cams 40, that the balls seated therein will engage radially with the said cam formations. Between the two sets of ball seatings are provided two parallel flanges 46 having peripheries corresponding to the interior peripheries of the sections 39 and 39'. These flanges 46 are spaced apart to provide a channel 47 for receiving the oppositely wound spiral springs 48. Associated with each flange 46 is a recessed portion 49 having stops 50 at each end thereof. The spiral springs 48 are coiled side by side and are each secured, as to one end to the bottom of channel 47, as by the screws 51, and as to the other end, to the inner wall of sections 39 and 39', as by means of hook 52 engaging with a projection associated with the surrounding wall. These springs are oppositely wound to cause opposite relative rotative movement of the two sections.

It will also be noted that when the two sections 39, 39' are assembled, the cam formation 40 of one section are directed oppositely to the cam formations of the other section.

Each section is provided with a pin or stud 51', projecting into a recessed portion 49 of keeper 41, so that limited relative rotative motion is permitted between the section and the keeper, but lateral movement is prevented. The said relative rotative movement is limited by the stops or abutments 50 at the ends of each recess 49 engaging with the stud, such as 51, or with any other suitable formation projecting from the inner periphery of the housing section.

*In operation.*—When it is desired to mount the chuck 37 upon the axle 38, the two sections 39 and 39' are rotated in opposite directions against the tension of springs 48. This serves to bring the lower or outermost portions of the cam formations 40 to positions opposite the balls 45. This permits the balls to move in their pockets away from the center of the chuck. While the sections are thus held against the said spring tension, the chuck is pushed over the end of axle 38 with the larger opening 43' in advance, thereupon the sections are released to respond to the actuation of their respective springs 48. This causes a wedging movement of the cams 40 against the balls 45 to force the balls into contact with the axle 38. As the cams are all of the same shape and development and symmetrically spaced, it follows that the chuck is brought into position with its axis exactly coinciding with that of the axle. The range of cam actuation, and consequently the range of ball movement, is such that the chuck is adapted to fit axles of different shapes and sizes, but in all cases, a perfect centering is assured by the action of the cams. In whatever position the cams come to rest, they so remain until arbitrarily operated by force applied to the outer surfaces of the sections 39 and 39'. By no possibility can pressure exerted by the axle upon the balls, affect or change the position of the cam formations.

It will thus be seen that this universal chuck is adapted to engage many forms and sizes of spindle, shaft or axle, and always maintain a perfect and stable centering therewith.

What we claim is:—

1. The combination of a brake drum gauge and a brake lining gauge, a gauge supporting rod and a rod supporting hub, each gauge being independently adjustable upon the supporting rod, a chuck for rotatably supporting the hub, said chuck being provided with means for mounting the same on axles of varying sizes, with the axis of the chuck coinciding with that of the axle.

2. The combination of a brake drum gauge and a brake lining gauge, a gauge supporting rod and a rod supporting hub, each gauge being independently adjustable upon the supporting rod, a chuck for rotatably supporting the hub, said chuck being provided with a plurality of spring actuated cams symmetrically arranged, and cooperating balls, as means for centering the chuck upon the axle.

3. In combination a brake lining gauge and a gauge supporting chuck, said chuck comprising cylindrical housing-sections, each section being provided with inwardly directed, symmetrically arranged cam formations, a keeper adapted to be enclosed within the housing sections and provided with flanged pockets arranged radially relative to the cam formations, balls seated in the pockets to cooperate with the cam formations, and spring means for causing oppositely directed rotative tension upon the respective housing-sections.

4. In combination a brake lining gauge and a gauge supporting chuck, said chuck comprising cylindrical housing-sections, each section being provided with inwardly directed, symmetrically arranged cam formations, a keeper adapted to be enclosed within the housing sections and provided with pockets arranged radially relative to the cam formations, balls seated in the pockets to cooperate with the cam formations, and springs connected between the respective sections and the keeper.

5. In combination a brake lining gauge and a gauge supporting chuck, said chuck comprising cylindrical housing-sections, each section being provided with inwardly directed, symmetrically arranged cam formations, a keeper adapted to be enclosed within the housing sections and provided with pockets arranged radially relative to the cam formations, balls seated in the pockets to cooperate with the cam formations, and oppositely arranged springs connected between the respective sections and the keeper.

6. The combination of a brake drum gauge and a brake lining gauge, a common support therefor, said gauges being adapted to have relative independent adjustment upon said support, one guage comprising a dial and pointer indicator and adapted to cooperate with the other gauge to secure its adjustment with respect to required clearance between the drum and the lining.

7. The combination of a brake drum gauge and a brake lining gauge, a common support therefor, said gauges being adapted to have relative independent adjustment upon said support, a hub connected to said support and adapted to be associated with means for securing its coaxial movement with respect to the wheel and to the axle.

8. In an element supporting chuck, the combination of cylindrical housing sections, each section being provided with inwardly projecting cam formations, the formations of one section being oppositely directed from those of the other section, a keeper enclosed within the housing sections, provided with radially extending flanged pockets, balls seated in the pockets and cooperating with the cam formations, and springs, each connected at one end to the keeper and at the other end to a housing section in order to cause opposite rotative movement of said housing sections.

9. In an element supporting chuck, the combination of cylindrical housing sections, each section being provided with inwardly projecting cam formations, the formations of one section being oppositely directed from those of the other section, a keeper enclosed within the housing sections, provided with radially extending pockets, balls seated in the pockets and cooperating with the cam formations, and springs, each connected at one end to the keeper and at the other end to a housing section in order to cause opposite rotative movement of said housing sections, said keeper being provided with peripheral flanges between its two ends forming a channel for receiving said springs.

10. In an element supporting chuck, the combination of cylindrical housing sections, each section being provided with inwardly projecting cam formations, the formations of one section being oppositely directed from those of the other section, a keeper enclosed within the housing sections, provided with radially extending pockets, balls seated in the pockets and cooperating with the cam formations, and springs, each connected at one end to the keeper and at the other end to a housing section, in order to cause opposite rotative movement of said housing sections, said keeper having cylindrical end portions and the housing sections provided with flanged ends having circular end openings for receiving said cylindrical end portions.

11. In an element supporting chuck, the combination of cylindrical housing sections, each section being provided with inwardly projecting cam formations, the formations of one section being oppositely directed from those of the other section, a keeper enclosed within the housing sections, provided with radially extending pockets, balls seated in the pockets and cooperating with the cam formations, and springs, each connected at one end to the keeper and at the other end to a housing section, in order to cause opposite rotative movement of said housing sections, said keeper having arc-shaped recesses with abutments at each end thereof and the housing sections having projections co-operating with said abutments for limiting their said relative rotative movement.

WILLIAM GEORGE HETHERINGTON.
GEORGE W. UFFORD.